Inventor
William Johnson

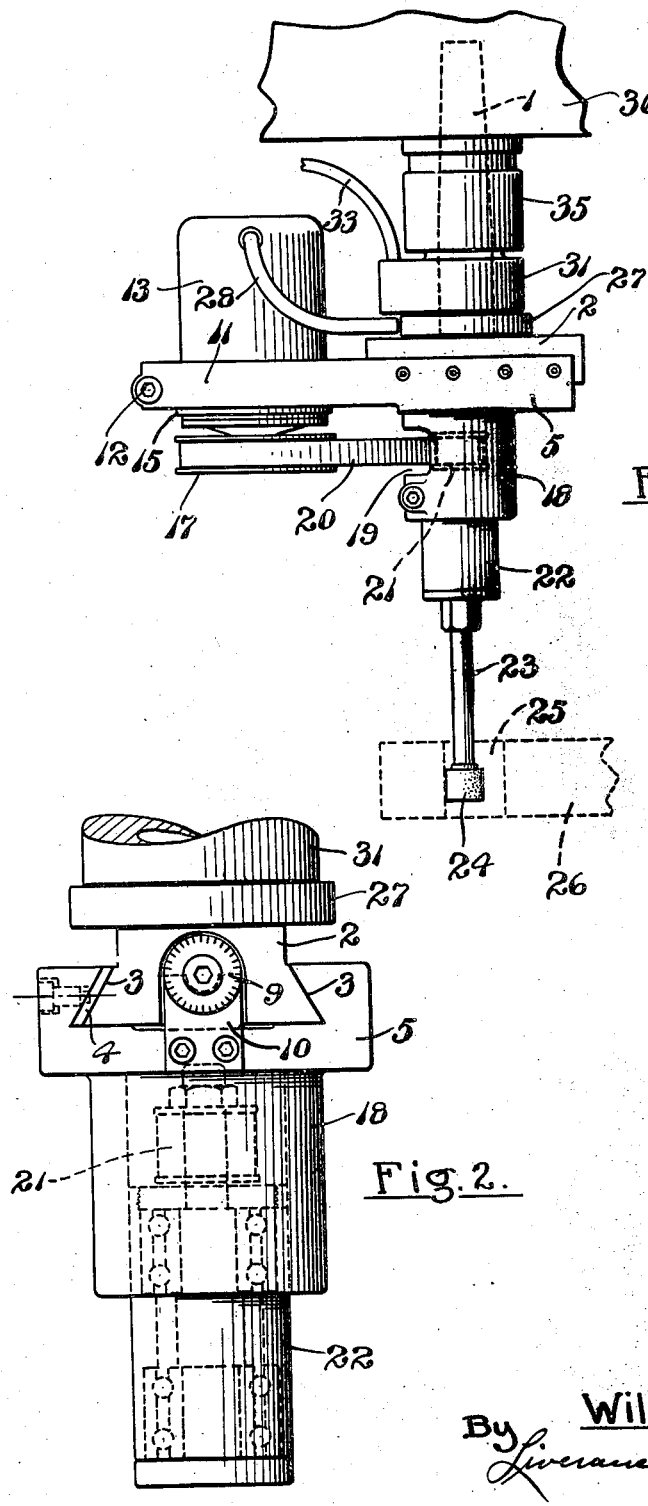

Patented Aug. 13, 1946

2,405,748

UNITED STATES PATENT OFFICE 2,405,748

INTERNAL GRINDER

William Johnson, Muskegon Heights, Mich., assignor of one-third to Arthur J. Brickner and one-third to Henry W. Kropf, Muskegon Heights, Mich.

Application October 18, 1944, Serial No. 559,299

1 Claim. (Cl. 51—43)

This invention relates to a novel construction of internal grinder. It is desirable in many cases to grind relatively small holes through pieces of material to exact size. This grinding operation is usually performed on hardened material and after a hole of approximate size has previously been provided. The present invention is directed to a very efficient and relatively simple internal grinder which may be applied to the vertical spindle of a drill press or similar machine, the part having the cylindrical hole therein to be ground being fixed to the bed of the machine, and the internal grinder as a unit moved up and down vertically so that the grinding wheel may traverse the hole which is being ground. The construction which I have devised for this purpose is sturdy, efficient and accurate in operation, is readily adjusted for holes of different diameters and is in general simple, effective, durable, easily applied and removed and one with which the desired grinding operation may be very rapidly performed.

An understanding of the invention may be had from the following description taken in connection with the accompanying drawings, in which, Fig. 1 is an elevation of the internal grinder unit of my invention.

Fig. 2 is a fragmentary elevation thereof taken at a side of Fig. 1.

Like reference characters refer to like parts in the different figures of the drawings.

Figure 3:
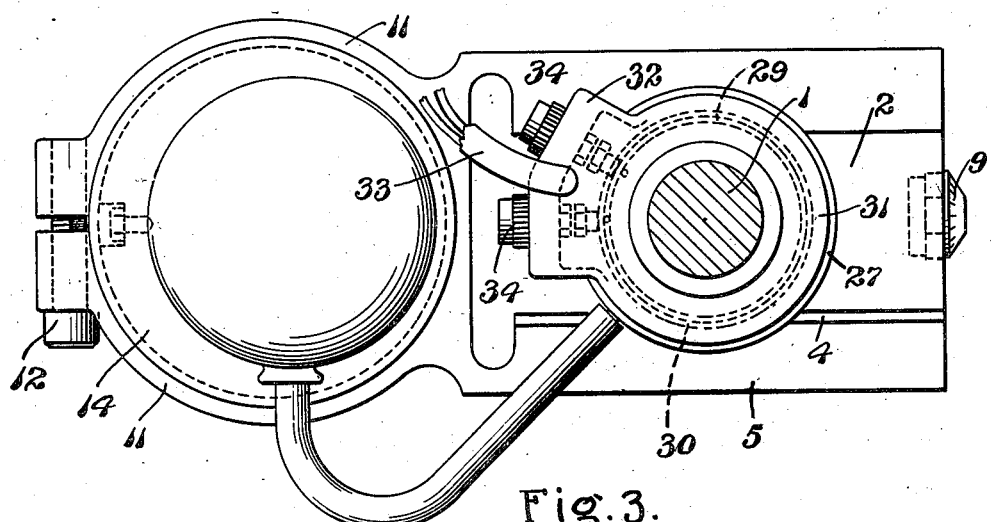
Fig. 3 is a somewhat enlarged plan view.

In the construction of the internal grinding unit a vertical spindle 1 at its lower end is permanently secured to or formed integral with a head 2 which has parallel downwardly and outwardly inclined sides 3. A gib 4 is located against one of said sides 3 and a block 5 is slidably mounted upon said head 2, having a suitably machined longitudinal recess for slidable engagement with one of said inclined sides 3 and the outer side of gib 4. This is conventional construction for adjustment and when the block 5 has been adjusted to any desired position it is secured in place by set screws at one side engaging with the gib 4 as shown.

Figure 4:
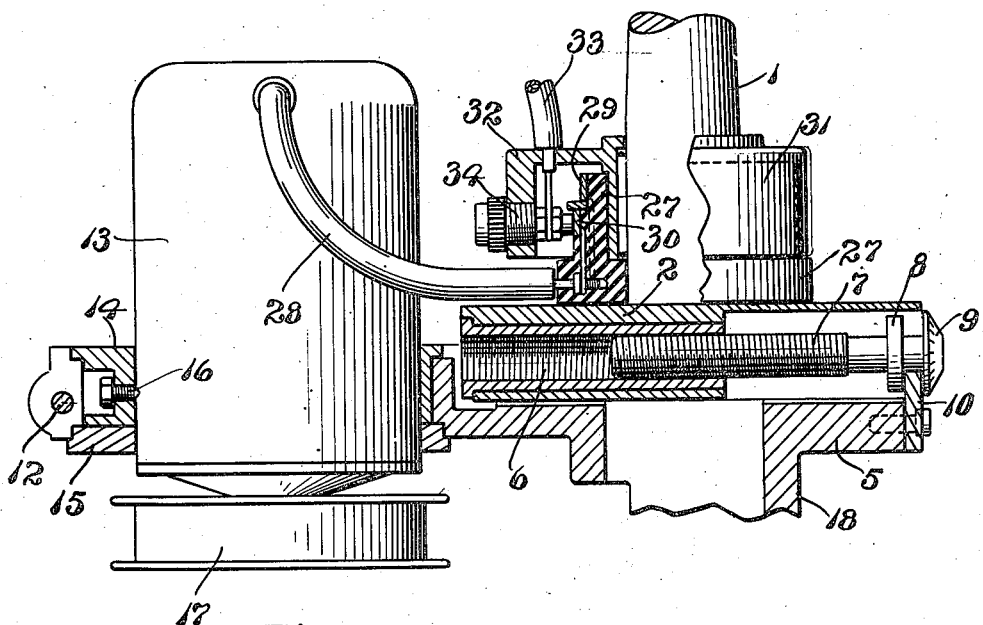
Fig. 4 is an enlarged fragmentary vertical sectional view.

The adjustment is accomplished by means of an internal threaded sleeve 6 (Fig. 4) connected with the head 2 into which an adjusting screw 7 is threaded, the shank of which near its outer end is provided with a collar 8 spaced from an outer index wheel or head 9. A plate 10 secured to the outer end of the block 5 extends into the space between said parts 8 and 9, whereby turning the shaft 7 causes a change in position of the block 5 with respect to the head 2 as is evident.

From the end of the block 5 opposite where the indexing wheel 9 is located curved arms 11 extend which are adapted at their outer ends to be brought together in clamping engagement by turning the screw 12 (Fig. 3). An electric motor 13 is mounted eccentrically on a ring 14 having an annular ledge to bear upon the arms 11, and at the under side a ring 15 (Fig. 4) may be detachably connected with the ring 14. The electric motor is held within the ring 14 by a set screw 16. It passes through the ring 15 and at its lower end its shaft is equipped with a driving pulley 17. The ring 14 may be rotated for belt adjustment.

From the lower end of the block 5 a sleeve 18 extends downwardly. It is open at its side adjacent the pulley 17 as indicated at 19. A driving belt 20 passes around the driving pulley 17 and through said opening in the sleeve 18 to pass around a pulley 21 indicated in dotted lines in Fig. 1. Said pulley is mounted at the upper end of a shaft 23 which extends into the sleeve 18 and which as indicated in Fig. 2, is provided with suitable bearings for the upper end of the said shaft 23 at the lower end of which a small grinding wheel 24 is secured. The grinding wheel is adapted to be entered into an opening 25 in the work 26 indicated in dotted lines in Fig. 1 for grinding the inner surfaces of said opening.

At the upper side of the head 2 a collar 27 of insulation material is located, through which the spindle 1 passes, said collar rotating with the spindle. A cable 28 housing the wires of an electric circuit leading to the motor 13 extends between the motor and said collar, and the circuit wires are connected to metallic rings 29 and 30 (Fig. 4) located around the upper portion of said collar said rings being insulated from each other. A housing member 31 is disposed around the spindle 1 and extends partly within the collar so that the collar 27 may turn around it, said housing remaining in fixed position when the spindle, the collar and the head 2 are turning about the vertical axis of the spindle. The housing at one side has a lateral extension 32. A cable 33 having circuit wires to carry electric current from an electric main or other source of supply leads to said lateral extension 32, the wires housed by said cable 33 having connections to two binding posts 34 on the housing extension 32. The inner ends of said binding posts contact the rings 29 and 30 respectively.

The vertical spindle 1 is adapted to be detachably secured to and within a suitable driven socket 35 from the overhead head 36 (Fig. 1) of a suitable machine tool such as a drill press or the like. The socket 35 is attached to a driven shaft which is rotated at a relatively low speed, therefore the spindle 1, head 2 and the parts carried thereon are turned at said low speed about the vertical axis of the spindle 1, the motor 13 turning in a circle about said axis. The motor in addition is driven at its regular speed of operation and drives the shaft 23 at the required high speed for grinding.

Depending upon the position of the adjustable block 5 upon the head 2, the axis of the shaft 23 may be located either in direct alinement with the axis of spindle 1 or eccentrically thereof. When adjusted to be offset a short distance, as shown in Fig. 1, the shaft 23 and the grinding wheel thereof will be rotated about the axis of said shaft 23 at high speed and will move bodily in an orbit around an extension of the axis of the spindle 1. Accordingly the grinding wheel 24 moving in said circular orbit about the axis of spindle 1 is carried around the inner surface of the hole 25 in the work 26. The hole 25 may be in a plate or block or other work which is clamped to the table of the machine, to the driving shaft of which the internal grinding unit of my invention is applied. The head 36 being vertically adjustable in the machines to which this internal grinding unit is applicable, the grinding wheel 24 is movable vertically to cover the vertical dimension of the opening at 25, while the orbital movement of the grinding wheel 24 causes said wheel to cover the circumferential inner surface of said opening. The collector ring construction shown in Fig. 4 permits the supply of electric current to the motor 13 while said motor is moving in its circular path of movement about the axis of the spindle 1.

The construction is very practical and useful. The motor is readily accessible for installation, removal, repair and replacement. The construction is relatively simple, is very durable and has proven in practice to be very effective.

The invention is defined in the appended claim and is to be considered comprehensive of all forms of structure coming within its scope.

I claim:

A mechanism as described comprising, a spindle mounted to be rotated, a head on said spindle, guideways on said head extending perpendicular to the axis of the spindle, a supporting block mounted on said guideways, means for adjusting said block on said guideways, a shaft rotatably mounted on said block having an axis parallel to the axis of the spindle, a relatively small pulley on said shaft, a grinding wheel on said shaft, a rotatable support on said block spaced laterally from said shaft, means for clamping said support in adjusted rotated position, an electric motor mounted with its shaft eccentric to the axis of said support, a relatively large pulley on said motor shaft and a belt extending around both of said pulleys.

WILLIAM JOHNSON.